United States Patent
Nagashima et al.

(10) Patent No.: US 12,217,767 B2
(45) Date of Patent: Feb. 4, 2025

(54) AUDIO DEVICE WITH SOUND DETERMINATION

(71) Applicant: SEMICONDUCTOR ENERGY LABORATORY CO., LTD., Atsugi (JP)

(72) Inventors: Fumiya Nagashima, Kanagawa (JP); Kengo Akimoto, Kanagawa (JP); Tatsuya Okano, Kanagawa (JP); Yusuke Koumura, Kanagawa (JP); Seiko Inoue, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 17/630,090

(22) PCT Filed: Jul. 29, 2020

(86) PCT No.: PCT/IB2020/057125
§ 371 (c)(1),
(2) Date: Jan. 25, 2022

(87) PCT Pub. No.: WO2021/028758
PCT Pub. Date: Feb. 18, 2021

(65) Prior Publication Data
US 2022/0366928 A1 Nov. 17, 2022

(30) Foreign Application Priority Data
Aug. 9, 2019 (JP) ................ 2019-147368

(51) Int. Cl.
*G10L 21/0272* (2013.01)
*G10L 25/30* (2013.01)

(52) U.S. Cl.
CPC .......... *G10L 21/0272* (2013.01); *G10L 25/30* (2013.01)

(58) Field of Classification Search
CPC ... G10L 21/0272; G10L 25/30; G10L 15/063; G10L 15/16; G10L 17/04; G10L 17/18;
(Continued)

(56) References Cited

U.S. PATENT DOCUMENTS 9,913,302 B2 3/2018 Parkinson et al.
10,490,194 B2 11/2019 Yamamoto et al.
(Continued)

FOREIGN PATENT DOCUMENTS

EP 2784710 A 10/2014
JP 2013-213893 A 10/2013
(Continued)

OTHER PUBLICATIONS

International Search Report (Application No. PCT/IB2020/057125) Dated Sep. 15, 2020.
(Continued)

*Primary Examiner* — Michael N Opsasnick
(74) *Attorney, Agent, or Firm* — Fish & Richardson P.C.

(57) ABSTRACT

An audio device capable of inhibiting malfunction of an information terminal is provided. The audio device includes a sound sensor portion, a sound separation portion, a sound determination portion, and a processing portion. The sound sensor portion has a function of sensing sound. The sound separation portion has a function of separating the sound sensed by the sound sensor portion into a voice and sound other than a voice. The sound determination portion has a function of storing the feature quantity of the sound. The sound determination portion has a function of determining, with a machine learning model such as a neural network model, whether the feature quantity of the voice separated by the sound separation portion is the stored feature quantity. The processing portion has a function of analyzing an instruction contained in the voice and generating an instruc-
(Continued)

tion signal representing the content of the instruction in the case where the feature quantity of the voice is the stored feature quantity. The processing portion has a function of performing, on the sound other than a voice separated by the sound separation portion, processing for canceling the sound other than a voice. Specifically, the processing portion has a function of performing, on the sound other than a voice, processing for inverting the phase thereof.

8 Claims, 11 Drawing Sheets

(58) Field of Classification Search
CPC ........... G10L 17/06; G10L 2021/02087; G10L 15/20; G10L 15/22; G10L 17/02; G10L 21/0232; G10L 21/028; G10L 25/24; G10L 2015/223; G10K 2210/1081; G10K 2210/3024; G10K 11/17827; G10K 11/17855; G10K 11/17873; G10K 11/1781; G10K 2210/3025; G10K 2210/3038; G10K 11/178; G06N 20/00; G06N 3/08
See application file for complete search history.

(56) References Cited

U.S. PATENT DOCUMENTS

| | | | |
|---|---|---|---|
| 10,650,379 | B2 | 5/2020 | Agrawal et al. |
| 11,302,726 | B2 | 4/2022 | Kobayashi et al. |
| 2014/0297528 | A1 | 10/2014 | Agrawal et al. |
| 2016/0098993 | A1 | 4/2016 | Yamamoto et al. |
| 2017/0061951 | A1* | 3/2017 | Starobin .......... G10K 11/17881 |
| 2017/0064363 | A1* | 3/2017 | Wexler .................. H04L 67/306 |
| 2017/0133041 | A1* | 5/2017 | Mortensen .............. G10L 15/02 |
| 2017/0236512 | A1* | 8/2017 | Williams ................. G06F 40/40 381/79 |
| 2017/0270919 | A1* | 9/2017 | Parthasarathi .......... G10L 17/06 |
| 2018/0228006 | A1* | 8/2018 | Baker ...................... G10L 15/22 |
| 2018/0233136 | A1* | 8/2018 | Torok ...................... G10L 15/22 |
| 2018/0260680 | A1* | 9/2018 | Finkelstein .............. G06N 5/04 |
| 2018/0295656 | A1 | 10/2018 | Parkinson et al. |
| 2019/0156846 | A1* | 5/2019 | Kida ...................... G06N 20/00 |
| 2019/0341057 | A1* | 11/2019 | Zhang .................. G10L 25/78 |
| 2020/0349935 | A1* | 11/2020 | Smith ..................... G10L 15/22 |
| 2022/0041101 | A1 | 2/2022 | Yamazaki et al. |

FOREIGN PATENT DOCUMENTS

| | | |
|---|---|---|
| JP | 2014-191823 A | 10/2014 |
| JP | 2016-075740 A | 5/2016 |
| JP | 2016-130751 A | 7/2016 |
| JP | 2017-513411 | 5/2017 |
| JP | 2018-107577 A | 7/2018 |
| JP | 2019-036174 A | 3/2019 |

OTHER PUBLICATIONS

Written Opinion (Application No. PCT/IB2020/057125) Dated Sep. 15, 2020.

* cited by examiner

AUDIO DEVICE WITH SOUND DETERMINATION

CROSS REFERENCE TO RELATED APPLICATIONS

This application is a U.S. National Phase Application under 35 U.S.C. § 371 of International Application PCT/IB2020/057125, filed on Jul. 29, 2020, which is incorporated by reference and claims the benefit of a foreign priority application filed in Japan on Aug. 9, 2019, as Application No. 2019-147368.

TECHNICAL FIELD

One embodiment of the present invention relates to an audio device and an operating method thereof. One embodiment of the present invention relates to an information processing system and an information processing method.

BACKGROUND ART

In recent years, speech recognition techniques have been developed. With the use of speech recognition, following utterance by the user of an information terminal such as a smartphone, the information terminal can execute an instruction contained in the utterance.

To increase speech recognition accuracy, noise is preferably canceled. Patent Document 1 discloses a headset that can cancel noise contained in a voice signal.

REFERENCE

Patent Document

[Patent Document 1] Japanese Translation of PCT International Application No. 2017-513411

SUMMARY OF THE INVENTION

Problems to be Solved by the Invention

When an information terminal performs speech recognition, for example, the information terminal might recognize utterance by a person other than the user and resultantly operate in a manner not intended by the user.

An object of one embodiment of the present invention is to provide an audio device that can inhibit malfunction of an information terminal. An object of one embodiment of the present invention is to provide an audio device that can cancel noise. An object of one embodiment of the present invention is to provide an audio device that can enable an information terminal to perform highly accurate speech recognition. An object of one embodiment of the present invention is to provide a novel audio device.

An object of one embodiment of the present invention is to provide an information processing system in which malfunction is inhibited. An object of one embodiment of the present invention is to provide an information processing system that can cancel noise. An object of one embodiment of the present invention is to provide an information processing system that can perform highly accurate speech recognition. An object of one embodiment of the present invention is to provide a novel information processing system.

An object of one embodiment of the present invention is to provide an operation method of an audio device that can inhibit malfunction of an information terminal. An object of one embodiment of the present invention is to provide an operation method of an audio device that can cancel noise. An object of one embodiment of the present invention is to provide an operation method of an audio device that can enable an information terminal to perform highly accurate speech recognition. An object of one embodiment of the present invention is to provide an operation method of a novel audio device.

An object of one embodiment of the present invention is to provide an information processing method by which malfunction is inhibited. An object of one embodiment of the present invention is to provide an information processing method which enables canceling noise. An object of one embodiment of the present invention is to provide an information processing method which enables performing highly accurate speech recognition. An object of one embodiment of the present invention is to provide a novel information processing method.

Note that the description of these objects does not preclude the existence of other objects. One embodiment of the present invention does not have to achieve all the objects. Objects other than these can be derived from the description of the specification, the drawings, the claims, and the like.

Means for Solving the Problems

One embodiment of the present invention is an audio device which includes a sound sensor portion, a sound separation portion, a sound determination portion, and a processing portion, and in which the sound sensor portion has a function of sensing first sound; the sound separation portion has a function of separating the first sound into second sound and third sound; the sound determination portion has a function of storing the feature quantity of sound; the sound determination portion has a function of determining, with a machine learning model, whether the feature quantity of the second sound is the stored feature quantity; the processing portion has a function of analyzing an instruction contained in the second sound and generating a signal representing the content of the instruction when the feature quantity of the second sound is the stored feature quantity; and the processing portion has a function of performing, on the third sound, processing for canceling the third sound to generate fourth sound.

In the above embodiment, learning for the machine learning model may be performed using supervised learning in which a voice is learning data and a label indicating whether the storing is to be performed is training data.

In the above embodiment, the machine learning model may be a neural network model.

In the above embodiment, the fourth sound may be sound having a phase opposite to the phase of the third sound.

Another embodiment of the present invention is an operation method of an audio device, which includes a step of sensing first sound; a step of separating the first sound into second sound and third sound; a step of determining, with a machine learning model, whether the feature quantity of the second sound is a stored feature quantity; a step of analyzing an instruction contained in the second sound and generating a signal representing the content of the instruction when the feature quantity of the second sound is the stored feature quantity; and a step of performing, on the third sound, processing for canceling the third sound to generate fourth sound.

In the above embodiment, learning for the machine learning model may be performed using supervised learning in which a voice is used as learning data and a label indicating whether the storing is to be performed is used as training data.

In the above embodiment, the machine learning model may be a neural network model.

In the above embodiment, the fourth sound may be sound having a phase opposite to the phase of the third sound.

Effect of the Invention

According to one embodiment of the present invention, an audio device that can inhibit malfunction of an information terminal can be provided. According to one embodiment of the present invention, an audio device that can cancel noise can be provided. According to one embodiment of the present invention, an audio device that can enable an information terminal to perform highly accurate speech recognition can be provided. According to one embodiment of the present invention, a novel audio device can be provided.

According to one embodiment of the present invention, an information processing system in which malfunction is inhibited can be provided. According to one embodiment of the present invention, an information processing system that can cancel noise can be provided. According to one embodiment of the present invention, an information processing system that can perform highly accurate speech recognition can be provided. According to one embodiment of the present invention, a novel information processing system can be provided.

According to one embodiment of the present invention, an operation method of an audio device that can inhibit malfunction of an information terminal can be provided. According to one embodiment of the present invention, an operation method of an audio device that can cancel noise can be provided. According to one embodiment of the present invention, an operation method of an audio device that can enable an information terminal to perform highly accurate speech recognition can be provided. According to one embodiment of the present invention, an operation method of a novel audio device can be provided.

According to one embodiment of the present invention, an information processing method by which malfunction is inhibited can be provided. According to one embodiment of the present invention, an information processing method which enables canceling noise can be provided. According to one embodiment of the present invention, an information processing method which enables performing highly accurate speech recognition can be provided. According to one embodiment of the present invention, a novel information processing method can be provided.

Note that the description of these effects does not preclude the existence of other effects. One embodiment of the present invention does not have to have all of these effects. Effects other than these can be derived from the description of the specification, the drawings, the claims, and the like.

BRIEF DESCRIPTION OF THE DRAWINGS

FIG. 1B1 and FIG. 1B2 are diagrams showing specific examples of the audio device.

MODE FOR CARRYING OUT THE INVENTION

Figure 1A:
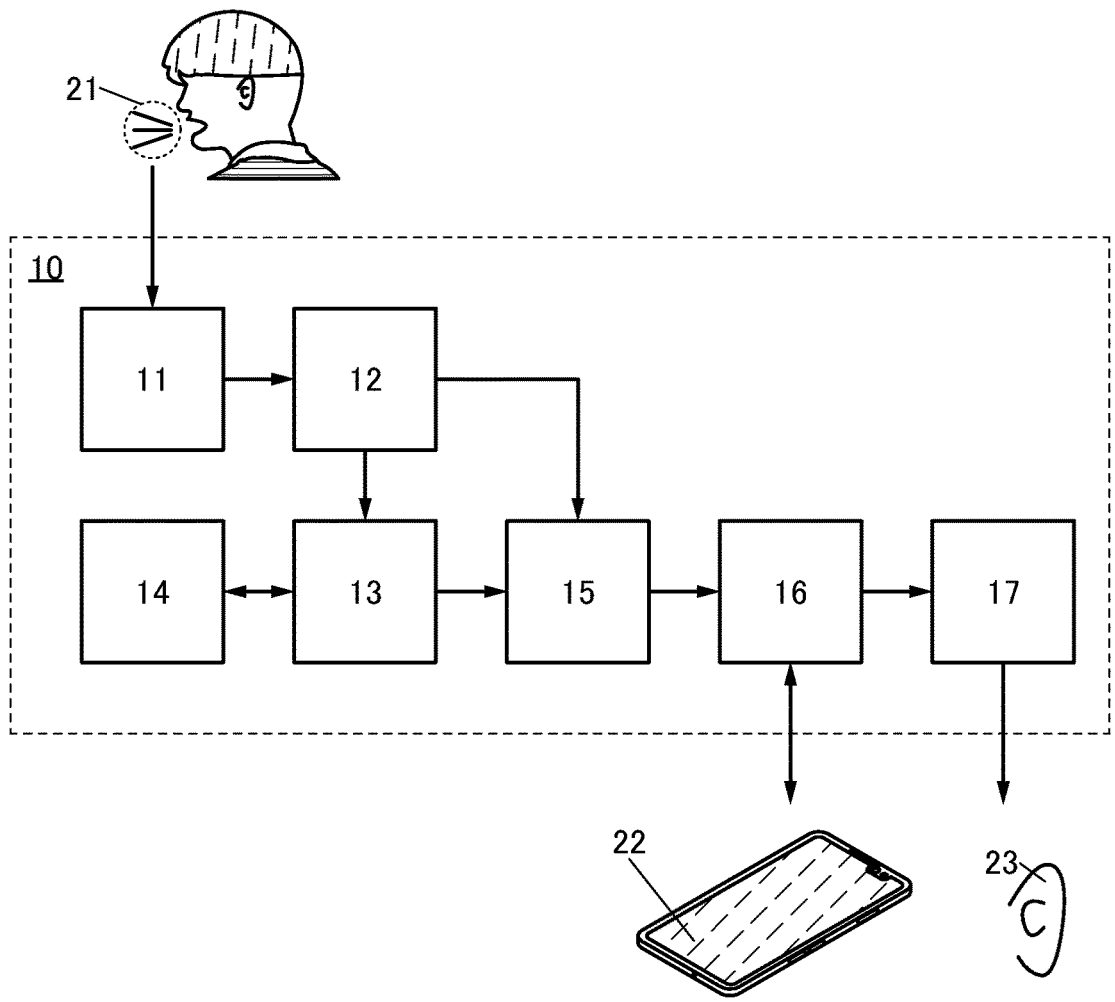
FIG. 1A is a block diagram showing a configuration example of an audio device.

Hereinafter, an embodiment is described with reference to the drawings. Note that the embodiment can be implemented in many different modes, and it is readily understood by those skilled in the art that modes and details thereof can be changed in various ways without departing from the spirit and scope thereof. Thus, the present invention should not be construed as being limited to the following description of the embodiment.

Note that in structures of the invention described below, the same portions or portions having similar functions are denoted by the same reference numerals in different drawings, and description thereof is not repeated.

Ordinal numbers such as "first," "second," and "third" used in this specification and the like are used in order to avoid confusion among components and do not limit the components numerically.

Embodiment

In this embodiment, an audio device of one embodiment of the present invention and an operation method thereof will be described. An information processing system including the audio device of one embodiment of the present invention and an information processing method using the information processing system will be described.

Configuration Example of Audio Device

The audio device of one embodiment of the present invention can be earphones or headphones, for example. The audio device of one embodiment of the present invention includes a sound sensor portion, a sound separation portion, a sound determination portion, a processing portion, a transmission/reception portion, and a sound output portion. Here, the sound sensor portion can be configured to include a microphone, for example. The sound output portion can be configured to include a speaker, for example.

The audio device of one embodiment of the present invention is electrically connected to an information terminal such as a smartphone. Here, the audio device of one embodiment of the present invention and the information terminal may be connected via wire or wirelessly by Bluetooth®, Wi-Fi®, or the like. The information processing system of one embodiment of the present invention can be regarded as being composed of the audio device of one embodiment of the present invention and the information terminal.

Before use of the audio device of one embodiment of the present invention, the feature quantity (voiceprint) of a voice is stored in advance. For example, the feature quantity of a voice of a user of the audio device of one embodiment of the present invention is stored. The feature quantity of a voice can be, for example, the frequency characteristics of the voice. The feature quantity can be the frequency characteristics obtained by Fourier transform of voice data, which is data representing a voice, for example. As the feature quantity of a voice, Mel frequency cepstrum coefficients (MFCC) can be used, for example.

When the sound sensor portion senses sound during use of the audio device of one embodiment of the present invention, the sound separation portion separates the sound into a voice and sound other than a voice. Here, the sound other than a voice is ambient sound, which can be regarded as noise, for example.

Then, the sound determination portion performs feature quantity extraction on the voice separated by the sound separation portion and determines whether the extracted feature quantity is the stored feature quantity. When the extracted feature quantity is the stored feature quantity, the processing portion analyzes an instruction contained in the voice and generates an instruction signal, which is a signal representing the content of the instruction. Note that the analysis of the instruction can be conducted using, for example, language processing such as morphological analysis. The generated instruction signal is output to the transmission/reception portion.

By contrast, when the feature quantity extracted by the sound determination portion is not the stored feature quantity, no instruction signal is generated.

Next, on the sound other than a voice separated by the sound separation portion, the processing portion performs processing for canceling the sound. For example, the processing portion generates sound having a phase opposite to that of the above sound.

Then, the sound processed by the processing portion and sound emitted by the information terminal are synthesized by the transmission/reception portion to be output to the sound output portion. Here, in the case where the information terminal plays music, the above sound emitted by the information terminal can be the music, for example.

The sound output to the sound output portion is emitted to the outside of the audio device of one embodiment of the present invention. The user of the audio device of one embodiment of the present invention can listen to the synthetic sound of the sound sensed by the sound sensor portion and the sound output by the sound output portion. As described above, the sound output by the sound output portion can contain, for example, sound having a phase opposite to that of the noise that is contained in the sound sensed by the sound sensor portion, in addition to the sound emitted by the information terminal. Accordingly, the user of the audio device of one embodiment of the present invention can listen to sound in which noise has been canceled, for example.

In the case where the processing portion generates an instruction signal and outputs the instruction signal to the transmission/reception portion, i.e., in the case where the feature quantity of the voice separated by the sound separation portion is the stored feature quantity, the transmission/reception portion outputs the instruction signal to the information terminal. The information terminal executes the instruction represented by the instruction signal. For example, in the case where the information terminal plays music and the instruction signal represents an instruction to "change the kind of music", the music played by the information terminal can be changed to a specified one. The above is an example of an operation method of the audio device of one embodiment of the present invention.

The processing portion generates an instruction signal only when the feature quantity of the voice separated by the sound separation portion is the stored feature quantity, whereby malfunction of the information terminal can be inhibited more than when an instruction signal is generated regardless of whether the feature quantity is stored. For example, in the case where the feature quantity of a voice of the user of the information terminal is stored in the audio device of one embodiment of the present invention, operation which is not intended by the user of the information terminal can be inhibited from being performed in response to a voice of a person other than the user of the information terminal.

Here, a machine learning model can be used, for example, in storing the feature quantity of a voice and determining whether the feature quantity of the voice input to the sound determination portion is the stored feature quantity. It is preferable to use a neural network model, for example, as the machine learning model to perform highly accurate inference. As a neural network model, a CNN (Convolutional Neural Network) or an RNN (Recurrent Neural Network) can be used, for example. As a learning method for a machine learning model, supervised learning can be employed, for example.

In the case of employing supervised learning, the feature quantity of a voice can be learning data, and a label indicating whether storing is to be performed can be training data, for example.

In the case of employing supervised learning, two-step learning including first learning and second learning can be performed. That is, after first learning is performed, second learning can be performed as additional learning.

In the first learning, a label indicating that "storing is not to be performed" is provided as training data to every piece of learning data. In the first learning, the feature quantities of voices of two or more people are preferably used as the learning data. It is particularly preferable that, for example, learning data of male voices and that of female voices be prepared in a well-balanced manner, and moreover, learning data of various types of voice, including particularly high and low male voices and particularly high and low female voices, be prepared in a well-balanced manner. In this way, it is possible to achieve high accuracy in performing later-described inference using a learning result, i.e., in determining whether the feature quantity of the voice input to the sound determination portion is the stored feature quantity.

In the second learning, a label indicating that "storing is to be performed" is provided as training data to every piece of learning data. In other words, the feature quantities of voices can be stored by the second learning.

In the second learning, for example, the feature quantity of a voice of the user of the audio device of one embodiment of the present invention is used as learning data. As the learning data, the feature quantities of voices uttered in various ways by a single person are preferably used in a well-balanced manner. Furthermore, it is preferable that the number of pieces of learning data be padded by changing the parameter of voice data which is obtained as learning data, such as the pitch of the voice. In this way, it is possible to achieve high accuracy in performing inference using a learning result, i.e., in determining whether the feature quantity of the voice input to the sound determination portion is the stored feature quantity.

The first learning can be performed before shipment of the audio device of one embodiment of the present invention, for example. By contrast, the second learning can be performed after shipment of the audio device of one embodiment of the present invention, for example. In this case, the user of the audio device of one embodiment of the present invention himself/herself can perform the second learning, for example. Thus, in the audio device of one embodiment of the present invention, the feature quantity of a voice can be stored by the user himself/herself.

Performing the above-described learning enables the sound determination portion to determine whether the feature quantity of the voice separated by the sound separation portion is the stored feature quantity. Specifically, following input of the voice to the sound determination portion, the sound determination portion can infer whether the feature quantity of the voice input to the sound determination portion is the stored feature quantity, on the basis of a learning result.

Whether the feature quantity of a voice is the stored feature quantity is determined using a machine learning model, whereby the accuracy of the determination can be higher than that in the case where the determination is performed without using a machine learning model. Thus, the information terminal electrically connected to the audio device of one embodiment of the present invention can be inhibited from executing an instruction contained in the voice whose feature quantity is not stored, for example. Moreover, the information terminal electrically connected to the audio device of one embodiment of the present invention can be inhibited from failing to execute an instruction contained in the voice whose feature quantity is stored. In other words, the information terminal electrically connected to the audio device of one embodiment of the present invention can perform highly accurate speech recognition.

FIG. 1A is a diagram showing a configuration example of an audio device 10, which is the audio device of one embodiment of the present invention. Note that FIG. 1A shows sound 21, an information terminal 22, and an ear 23 in addition to the audio device 10 for description of functions of the audio device 10 and the like. Here, the information terminal 22 can be a smartphone, for example. Alternatively, the information terminal 22 can be a portable electronic device such as a tablet terminal, a laptop PC, or a portable (mobile) game machine. Note that the information terminal 22 may be an electronic device other than such portable electronic devices.

The audio device 10 includes a sound sensor portion 11, a sound separation portion 12, a sound determination portion 13, a memory portion 14, a processing portion 15, a transmission/reception portion 16, and a sound output portion 17.

Here, the transmission/reception portion 16 is electrically connected to the information terminal 22. The audio device 10 and the information terminal 22 may be connected via wire or wirelessly by Bluetooth®, Wi-Fi®, or the like. The information processing system of one embodiment of the present invention can be regarded as being composed of the audio device 10 and the information terminal 22.

In FIG. 1A, the arrows indicate the flow of data, a signal, and the like. Note that the flow is not limited to the flow shown in FIG. 1A, which is merely an example. The same applies to the other diagrams.

The sound sensor portion 11 has a function of sensing sound. For example, the sound sensor portion 11 has a function of sensing the sound 21 containing a human voice. The sound sensor portion 11 can be configured to include a microphone, for example.

The sound separation portion 12 has a function of separating the sound sensed by the sound sensor portion 11 according to the properties. For example, the sound separation portion 12 has a function of separating the sound 21 into a voice and sound other than a voice when the sound sensor portion 11 senses the sound 21 containing a human voice. Here, the sound other than a voice is ambient sound, which can be regarded as noise, for example.

The sound separation portion 12 has a function of separating the sound sensed by the sound sensor portion 11 according to the frequency of the sound, for example. For example, a human voice is composed mainly of frequency components in the range of 0.2 kHz to 4 kHz. Therefore, when the sound sensed by the sound sensor portion 11 is separated into sound having frequencies in the range of 0.2 kHz to 4 kHz and sound having other frequencies, for example, the sound sensed by the sound sensor portion 11 can be separated into a voice and sound other than a voice. Note that the intermediate frequency of a human voice is said to be around 1 kHz. Thus, the sound sensed by the sound sensor portion 11 may be separated into a voice and sound other than a voice by being separated into sound having frequencies of around 1 kHz and sound having other frequencies, for example. The sound sensed by the sound sensor portion 11 may be separated into sound having frequencies in the range of 0.5 kHz to 2 kHz and sound having other frequencies, for example. Furthermore, the frequency according to which sound separation is performed may be changed in accordance with the kind of the sound sensed by the sound sensor portion 11, for example. In the case where the sound sensor portion 11 senses sound containing a female voice, for example, sound having a higher frequency than in the case where sound containing a male voice is sensed may be separated as a voice. When the frequency according to which sound separation is performed is changed in accordance with the kind of the sound sensed by the sound sensor portion 11, the sound sensed by the sound sensor portion 11 can be highly accurately separated into a voice and sound other than a voice, for example.

The sound determination portion 13 has a function of performing feature quantity extraction on the sound separated by the sound separation portion 12. Specifically, the sound determination portion 13 has a function of performing feature quantity extraction on the voice separated by the sound separation portion 12, for example. Note that the feature quantity of a voice can be regarded as a voiceprint.

The feature quantity can be, for example, frequency characteristics. For example, the feature quantity can be the frequency characteristics obtained by Fourier transform of sound data, which is data representing sound. As the feature quantity of sound, MFCC can be used, for example.

The extracted feature quantity can be stored. For example, a voiceprint can be stored. As described above, the sound determination portion 13 can be regarded as having a function of storing the feature quantity of sound. The results of storing can be held in the memory portion 14.

The sound determination portion 13 has a function of determining whether the extracted feature quantity is the stored feature quantity. A machine learning model can be used in the storing of a feature quantity and the determining, for example. It is preferable to use a neural network model, for example, as the machine learning model to perform highly accurate inference. As a neural network model, a CNN or an RNN can be used, for example. As a learning method for a machine learning model, supervised learning can be employed, for example.

The processing portion 15 has a function of processing the sound output by the sound separation portion 12, for example. For example, the processing portion 15 has a function of analyzing an instruction contained in the voice output by the sound separation portion 12 and generating an instruction signal, which is a signal representing the content of the instruction. Note that the analysis of the instruction can be conducted using, for example, language processing such as morphological analysis.

Furthermore, the processing portion 15 has a function of performing processing for canceling noise or the like in the sound output by the sound separation portion 12. For example, the processing portion 15 can cancel the noise or the like output by the sound separation portion 12, by generating sound having a phase opposite to that of the noise or the like.

Here, the processing portion 15 has a function of performing processing on the basis of the results of the determination by the sound determination portion 13. For example, the processing portion 15 can generate an instruction signal only in the case where the sound separation portion 12 outputs the voice whose feature quantity is stored.

The transmission/reception portion 16 has a function of synthesizing the sound processed by the processing portion 15 and sound emitted by the information terminal 22. Here, in the case where the information terminal 22 plays music, the above sound emitted by the information terminal 22 can be the music, for example.

In the case where the processing portion 15 generates an instruction signal, the instruction signal can be received by the transmission/reception portion 16. The transmission/reception portion 16 has a function of outputting the received instruction signal to the information terminal 22. The information terminal 22 has a function of executing the instruction represented by the instruction signal. For example, in the case where the information terminal 22 plays music and the instruction signal represents an instruction to "change the kind of music", the music played by the information terminal 22 can be changed to a specified one.

As described above, an instruction signal is generated only in the case where the feature quantity of the voice separated by the sound separation portion 12 is the stored feature quantity, for example. Thus, malfunction of the information terminal 22 can be inhibited more than when an instruction signal is generated regardless of whether the feature quantity is stored. For example, in the case where the feature quantity of a voice of the user of the information terminal 22 is stored in the audio device 10, operation which is not intended by the user of the information terminal 22 can be inhibited from being performed in response to a voice of a person other than the user of the information terminal 22.

The sound output portion 17 has a function of emitting the sound synthesized by the transmission/reception portion 16 to the outside of the audio device 10. The user of the audio device 10 can listen to the synthetic sound of the sound sensed by the sound sensor portion 11 and the sound output by the sound output portion 17 with the ear 23. As described above, the sound output by the sound output portion 17 can contain, for example, sound having a phase opposite to that of the noise or the like that is contained in the sound sensed by the sound sensor portion 11, in addition to the sound emitted by the information terminal 22. Accordingly, the user of the audio device 10 can listen to sound in which noise or the like has been canceled, for example. The sound output portion 17 can be configured to include a speaker, for example.

Figure 1A:
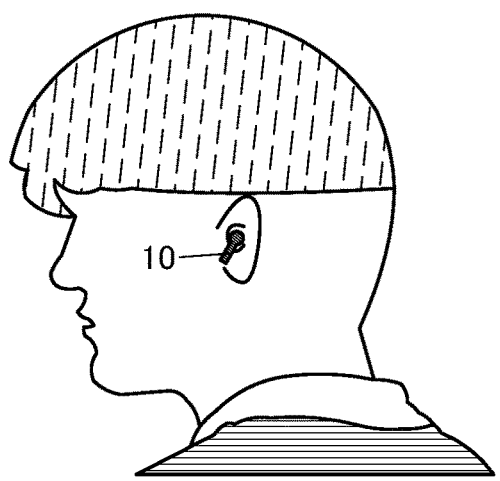
Figure 1A:
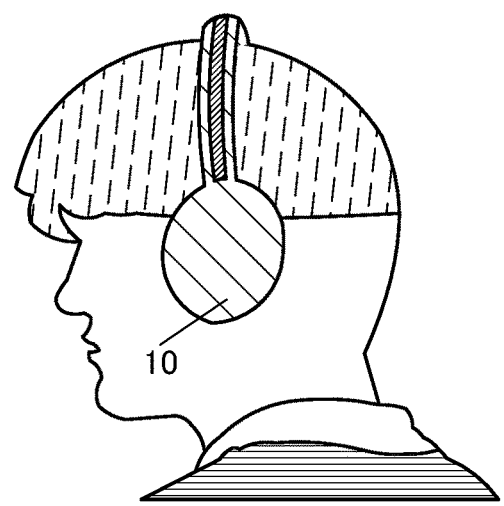

FIG. 1B1 and FIG. 1B2 are diagrams showing specific examples of the audio device 10. As shown in FIG. 1B1, the audio device 10 can be earphones. Specifically, the audio device 10 can be earphones to be worn by the user of the information terminal 22. As shown in FIG. 1B2, the audio device 10 can be headphones. Specifically, the audio device 10 can be headphones to be worn by the user of the information terminal 22.

Operation Example of Audio Device

Figure 2A:
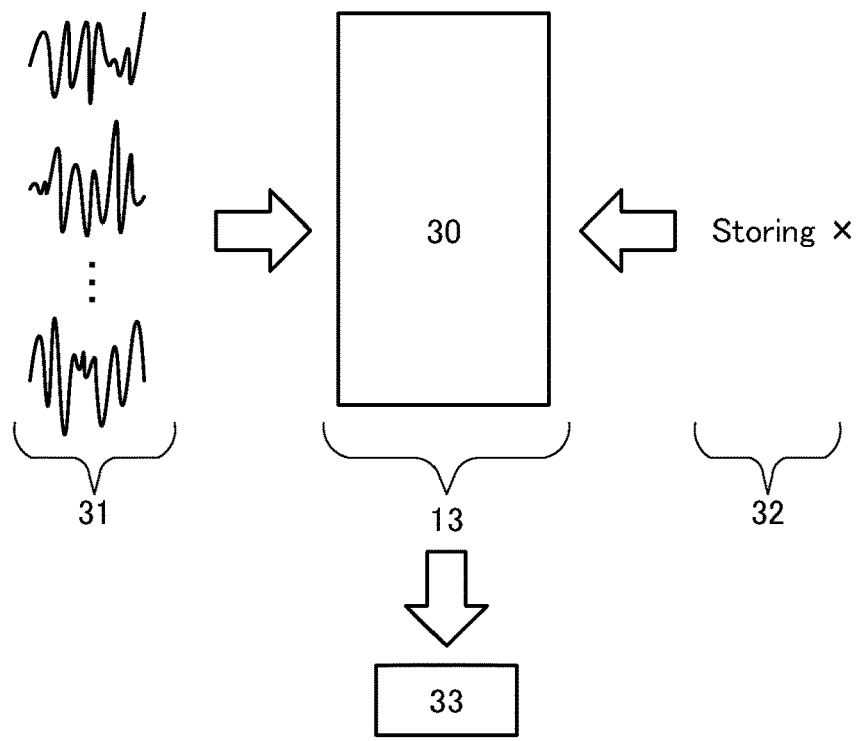
FIG. 2A and FIG. 2B are schematic views showing an example of an operation method of an audio device.
Figure 2B:
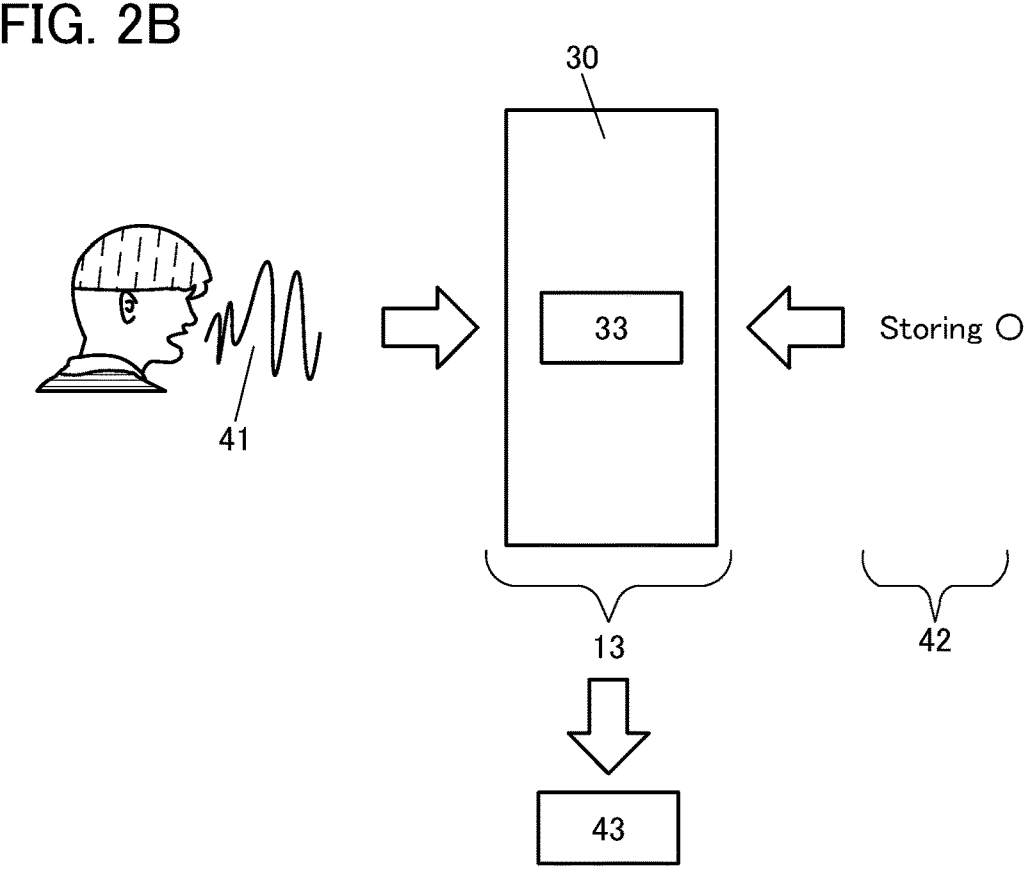

An example of an operation method of the audio device 10 is described below. FIG. 2A and FIG. 2B show an example of a method for storing the feature quantity of sound in the case where the sound determination portion 13 has a function of determining whether the feature quantity of sound is a stored feature quantity with the use of a machine learning model. Specifically, FIG. 2A and FIG. 2B show an example of a method for storing the feature quantity of sound with the use of supervised learning.

First, as shown in FIG. 2A, the sound determination portion 13 performs feature quantity extraction on sound data 31. The feature quantity is, for example, the frequency characteristics of the sound represented by the sound data 31. For example, the feature quantity can be the frequency characteristics obtained by Fourier transform of the sound data 31. As the feature quantity, MFCC can be used, for example.

Then, data which represents the extracted feature quantity and to which a label 32 indicating that "storing is not to be performed" is provided is input to a generator 30 placed in the sound determination portion 13. The generator 30 is a program using a machine learning model. The generator 30 performs learning where the data which represents the feature quantity extracted from the sound data 31 is used as learning data and the label 32 is used as training data, to output a learning result 33. The learning result 33 can be held in the memory portion 14. In the case where the generator 30 is a program using a neural network model, the learning result 33 can be a weight coefficient.

Voices of two or more people are preferably used as the sound data 31 that is learning data. It is particularly preferable that, for example, sound data of male voices and that of female voices be prepared in a well-balanced manner, and moreover, sound data of various types of voice, including particularly high and low male voices and particularly high and low female voices, be prepared in a well-balanced manner to perform learning. In this way, it is possible to achieve high accuracy in performing later-described inference using a learning result, i.e., in determining whether the feature quantity of the sound input to the sound determination portion 13 is the stored feature quantity.

Next, as shown in FIG. 2B, the sound determination portion 13 performs feature quantity extraction on sound data 41. The feature quantity is preferably of the same kind as the feature quantity used as the learning data in FIG. 2A. For example, in the case where MFCC is extracted from the sound data 31 to be used as learning data, extraction of MFCC is preferably performed on the sound data 41 as well.

Then, data which represents the extracted feature quantity and to which a label 42 indicating that "storing is to be performed" is provided is input to the generator 30 that has read the learning result 33. The generator 30 performs learning where the data which represents the feature quantity extracted from the sound data 41 is used as learning data and the label 42 is used as training data, to output a learning result 43. The learning result 43 can be held in the memory portion 14. In the case where the generator 30 is a program using a neural network model, the learning result 43 can be a weight coefficient.

In FIG. 2A and FIG. 2B, the label indicating that "storing is to be performed" is shown as "Storing ○" and the label indicating that "storing is not to be performed" is shown as "Storing x". The same applies to the other diagrams.

The sound data 41 that is learning data is, for example, a voice of the user of the audio device 10. In the case where a voice is used as the sound data 41, the feature quantities of voices uttered in various ways by a single person are preferably used in a well-balanced manner to perform learning. Furthermore, it is preferable that the number of pieces of the sound data 41 be padded by changing the parameter of voice data which is obtained as the sound data 41, such as the pitch of the voice, to perform learning. In this way, it is possible to achieve high accuracy in performing later-described inference using a learning result, i.e., in determining whether the feature quantity of the sound input to the sound determination portion 13 is the stored feature quantity.

In the above manner, the sound determination portion 13 can perform learning in which the feature quantity of sound not to be stored is used as learning data as shown in FIG. 2A and then can perform learning in which the feature quantity of sound to be stored is used as learning data as shown in FIG. 2B. In other words, two-step learning including first learning and second learning can be performed. Specifically, after the first learning shown in FIG. 2A is performed, the second learning shown in FIG. 2B can be performed as additional learning.

The first learning can be performed before shipment of the audio device 10, for example. By contrast, the second learning can be performed after shipment of the audio device 10, for example. In this case, the user of the audio device 10 himself/herself can perform the second learning, for example. Thus, in the audio device 10, the feature quantity of sound can be stored by the user himself/herself.

Performing the above-described learning enables the sound determination portion 13 to determine whether the feature quantity of the sound separated by the sound separation portion 12 is the stored feature quantity, for example. Specifically, following input of the sound to the sound determination portion 13, the sound determination portion 13 can infer whether the feature quantity of the input sound is the stored feature quantity on the basis of the learning result 43.

Whether the feature quantity of sound is the stored feature quantity is determined using a machine learning model, whereby the accuracy of the determination can be higher than that in the case where the determination is performed without using a machine learning model. Thus, the information terminal 22 electrically connected to the audio device 10 can be inhibited from executing an instruction contained in the sound whose feature quantity is not stored, for example. Moreover, the information terminal 22 electrically connected to the audio device 10 can be inhibited from failing to execute an instruction contained in the sound whose feature quantity is stored. In other words, the information terminal 22 electrically connected to the audio device 10 can perform highly accurate speech recognition.

Figure 3:
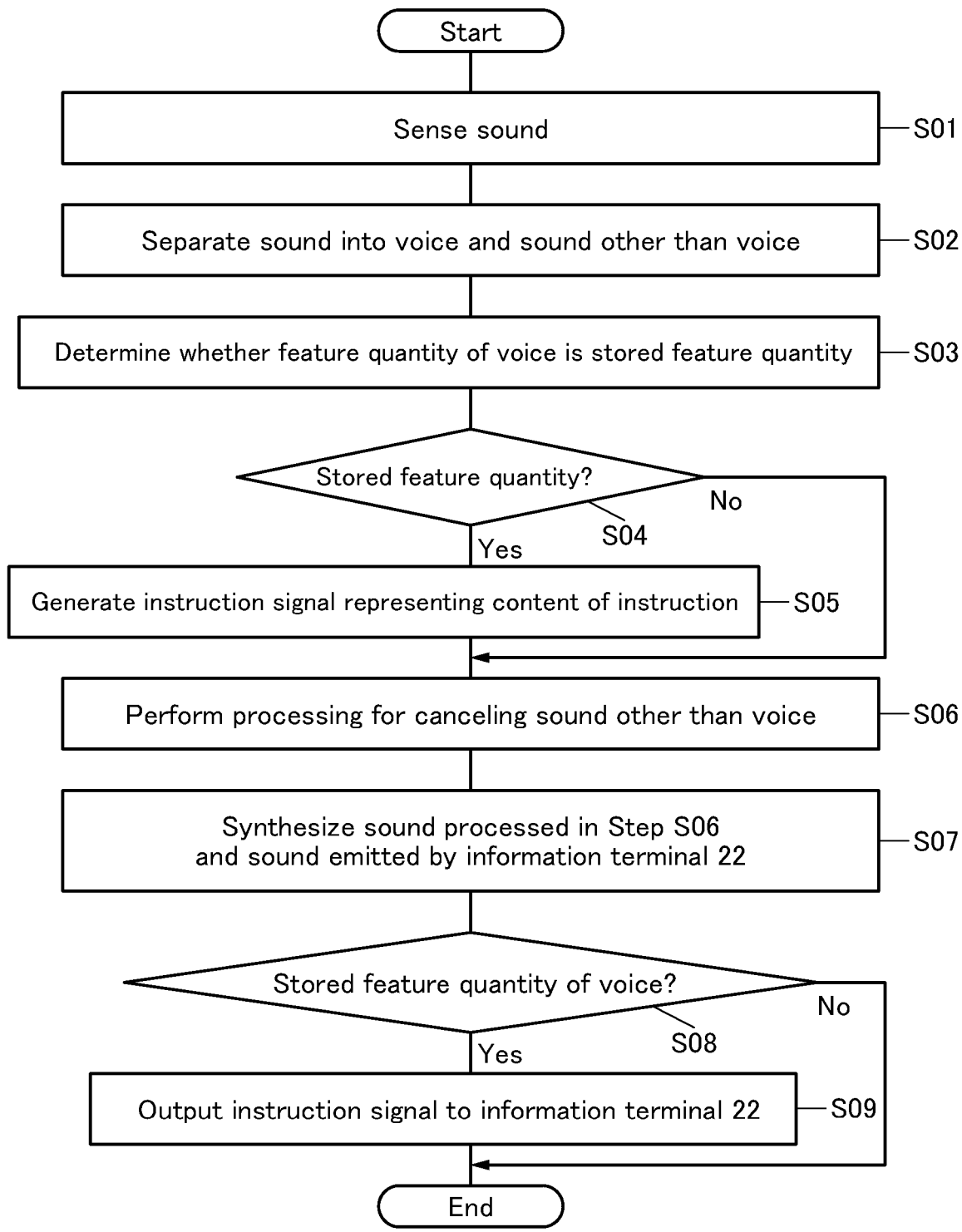
FIG. 3 is a flowchart showing an example of an operation method of an audio device.

Next, an example of an operation method of the audio device 10 that is in use is described. FIG. 3 is a flowchart showing an example of an operation method of the audio device 10 that is in use. FIG. 4A to FIG. 4C and FIG. 5A and FIG. 5B are schematic views illustrating the details of the steps shown in FIG. 3. Note that the following description is made on the assumption that the feature quantity of sound has already been stored by the method shown in FIG. 2A and FIG. 2B or the like.

Following sensing of sound by the sound sensor portion 11 (Step S01), the sound separation portion 12 separates the sensed sound according to the properties. For example, in the case where the sound sensor portion 11 senses sound containing a human voice, the sound separation portion 12 separates the sensed sound into the voice and sound other than a voice (Step S02). As described above, the sound other than a voice is ambient sound, which can be regarded as noise, for example.

Figure 4A:
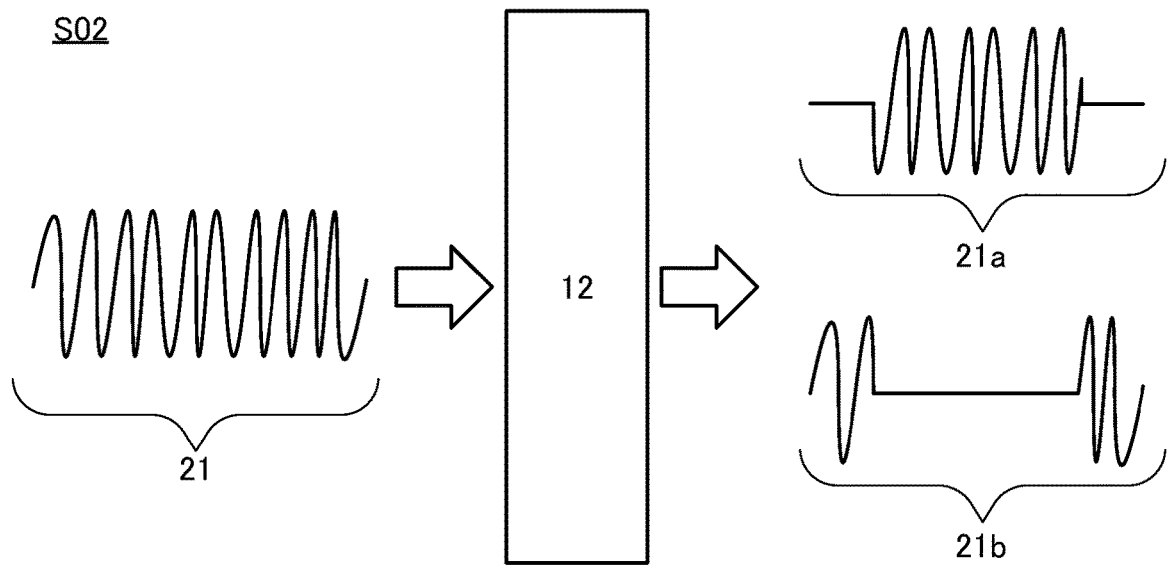
FIG. 4A to FIG. 4C are schematic views showing an example of an operation method of an audio device.

FIG. 4A shows a specific example of Step S02. As described above, the sound separation portion 12 has a function of separating the sound sensed by the sound sensor portion 11 according to the frequency of the sound, for example. FIG. 4A shows an example in which the sound 21 that is sensed by the sound sensor portion 11 and input to the sound separation portion 12 is separated into sound 21a and sound 21b according to the frequency.

As described above, for example, a human voice is composed mainly of frequency components in the range of 0.2 kHz to 4 kHz. Therefore, when the sound sensed by the sound sensor portion 11 is separated into sound having frequencies in the range of 0.2 kHz to 4 kHz and sound having other frequencies, for example, the sound sensed by the sound sensor portion 11 can be separated into a voice and sound other than a voice. Note that the intermediate frequency of a human voice is said to be around 1 kHz. Thus, the sound sensed by the sound sensor portion 11 may be separated into a voice and sound other than a voice by being separated into sound having frequencies of around 1 kHz and sound having other frequencies, for example. The sound sensed by the sound sensor portion 11 may be separated into sound having frequencies in the range of 0.5 kHz to 2 kHz and sound having other frequencies, for example. Furthermore, the frequency according to which sound separation is performed may be changed in accordance with the kind of the sound sensed by the sound sensor portion 11, for example. In the case where the sound sensor portion 11 senses sound containing a female voice, for example, sound having a higher frequency than in the case where sound containing a male voice is sensed may be separated as a voice. When the frequency according to which sound separation is performed is changed in accordance with the kind of the sound sensed by the sound sensor portion 11, the sound sensed by the sound sensor portion 11 can be highly accurately separated into a voice and sound other than a voice, for example.

The following description is made on the assumption that the sound 21a is a voice and the sound 21b is sound other than a voice.

Figure 4B:
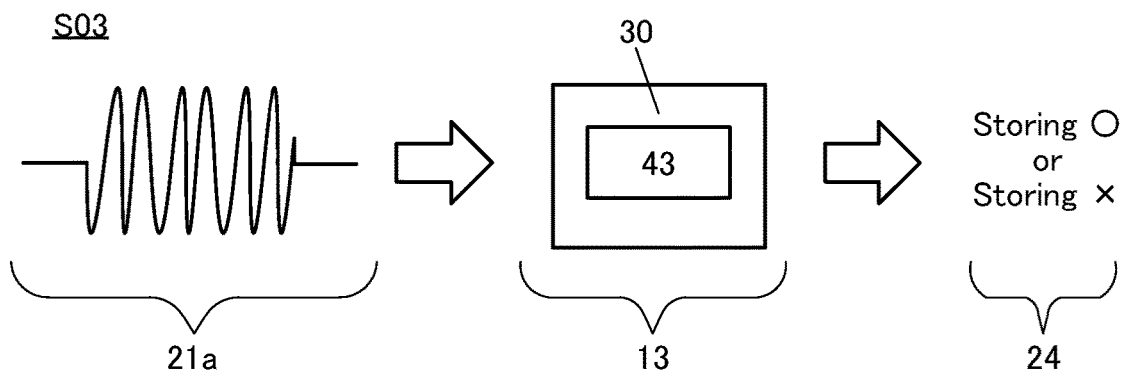

After the sound separation portion 12 separates the sound 21 into the sound 21a that is a voice and the sound 21b that is sound other than a voice, the sound determination portion 13 performs feature quantity extraction on the sound 21a and determines whether the extracted feature quantity is the stored feature quantity (Step S03). Specifically, as shown in FIG. 4B, the sound 21a is input to, for example, the generator 30 that has read the learning result 43, and the generator 30 outputs data 24 indicating that the feature quantity is stored or not; thus, it is possible to determine whether the feature quantity extracted from the sound 21a is the stored feature quantity.

When the feature quantity extracted from the sound 21a is the stored feature quantity, the processing portion 15 analyzes an instruction contained in the sound 21a and generates an instruction signal, which is a signal representing the content of the instruction (Step S04 and Step S05). The analysis of the instruction can be conducted using, for example, language processing such as morphological analysis. By contrast, when the feature quantity extracted from the sound 21a is not the stored feature quantity, the analysis of the instruction and generation of the instruction signal are not performed (Step S04).

Figure 4C:
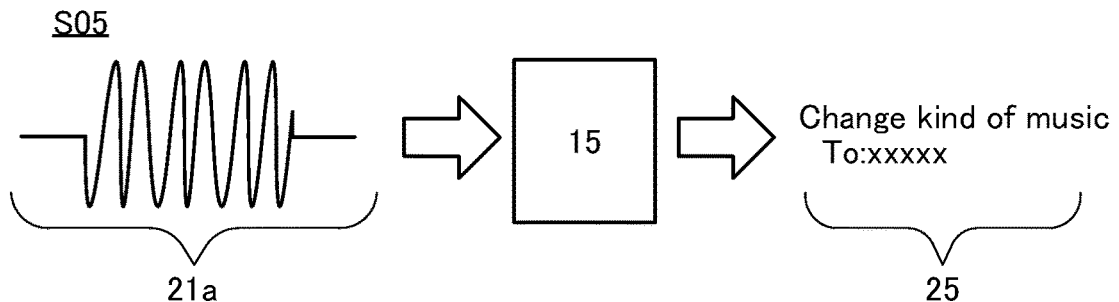

FIG. 4C shows, as a specific example of the processing described as Step S05, the case where the instruction contained in the sound 21a is an instruction to "change the kind of music". As shown in FIG. 4C, when the sound 21a containing the instruction to "change the kind of music" is input to the processing portion 15, an instruction signal 25 representing the instruction to "change the kind of music" is output. The instruction signal 25 is output to the transmission/reception portion 16. Note that in FIG. 4C, "Change kind of music To:xxxxx" is shown to the effect that "the kind of music should be changed to xxxxx". The same applies to the other diagrams.

In order that the sound 21a contain an instruction to "change the kind of music", for example, a person whose voiceprint is stored utters a phrase to the effect that "the kind of music should be changed". When the sound containing this phrase is sensed by the sound sensor portion 11 as the sound 21 and the voice contained in the sound 21 is separated by the sound separation portion 12 as the sound 21a, the sound 21a can contain an instruction to "change the kind of music". Thus, the audio device 10 can be regarded as having a function of performing speech recognition.

Figure 5A:
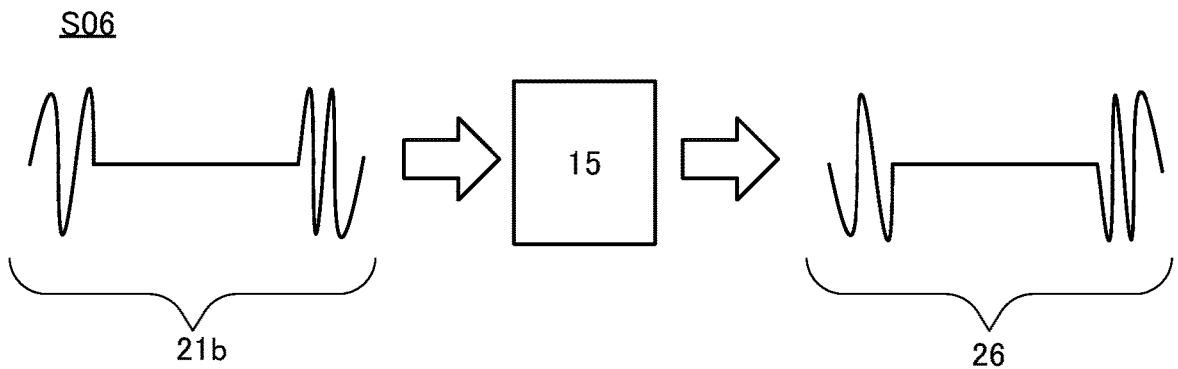
FIG. 5A and FIG. 5B are schematic views showing an example of an operation method of an audio device.

Then, the processing portion 15 performs, on the sound 21b which has been separated by the sound separation portion 12 and which is sound other than a voice, processing for canceling the sound 21b (Step S06). For example, as shown in FIG. 5A, the sound 21b is input to the processing portion 15 and sound 26 having a phase obtained by inversion of the phase of the sound 21b is output.

After that, the sound 26 that is the sound processed by the processing portion 15 and sound emitted by the information terminal 22 are synthesized by the transmission/reception portion 16 and output to the sound output portion 17 (Step S07). Here, in the case where the information terminal 22 plays music, the above sound emitted by the information terminal 22 can be the music, for example.

In the case where the processing portion 15 generates the instruction signal 25 and outputs the instruction signal to the transmission/reception portion 16, i.e., in the case where the feature quantity of the sound 21a that is a voice separated by the sound separation portion 12 is the stored feature quantity, the transmission/reception portion 16 outputs the instruction signal 25 to the information terminal 22 (Step S08 and Step S09).

Figure 5B:
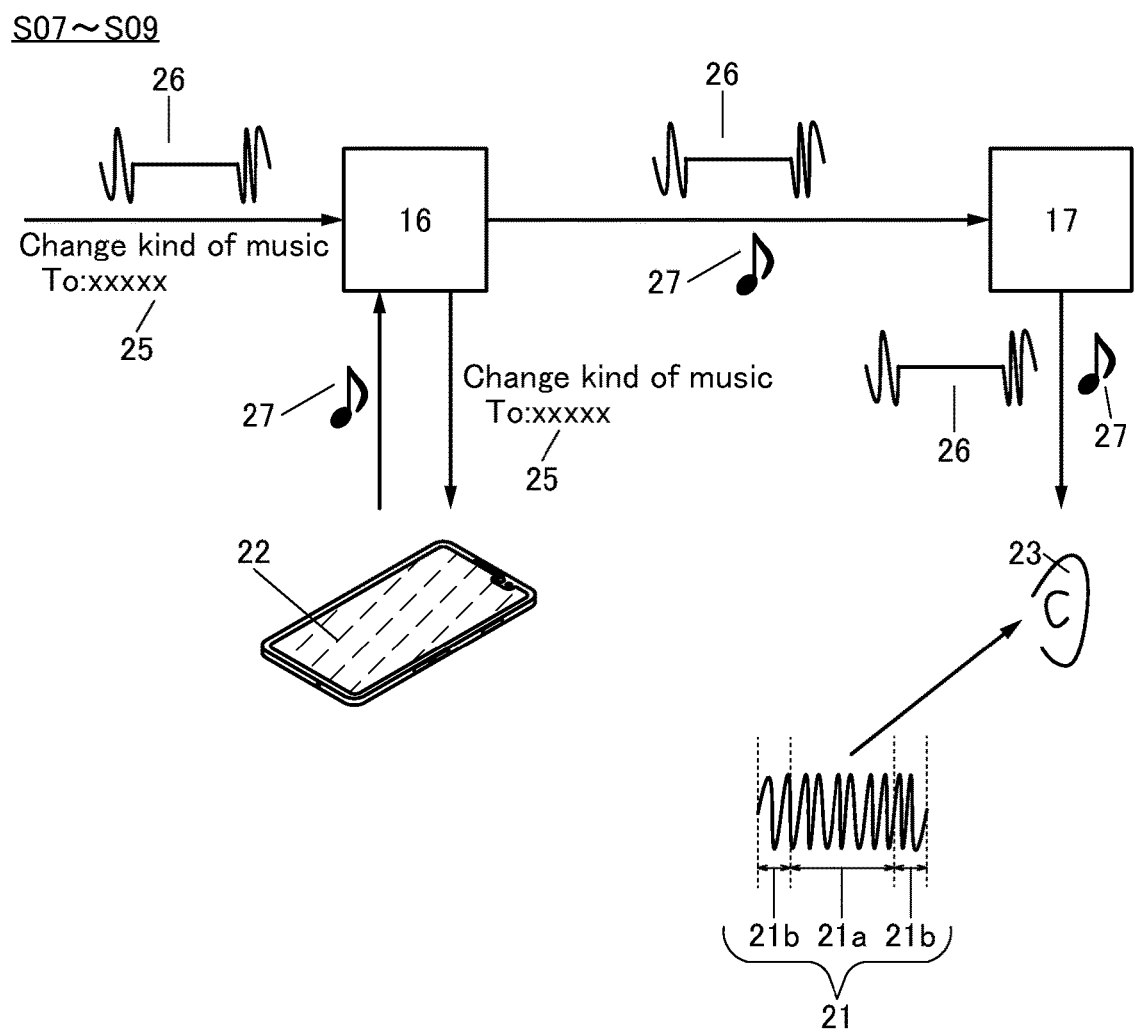

FIG. 5B shows a specific example of Step S07 to Step S09. FIG. 5B shows an example in which the sound 26 that is the sound having a phase obtained by inversion of the phase of the sound 21b, the instruction signal 25 representing an instruction to "change the kind of music", and sound 27 emitted by the information terminal 22 are input to the transmission/reception portion 16. The sound 26 and the sound 27 are synthesized by the transmission/reception portion 16 to be output to the sound output portion 17. The sound input to the sound output portion 17 is emitted to the outside of the audio device 10. The user of the audio device 10 can listen to the synthetic sound of the sound 21 sensed by the sound sensor portion 11 and the sound 26 and the sound 27 output by the sound output portion 17 with the ear 23.

As described above, the sound 26 is sound obtained by separating the sound 21b, which is contained in the sound 21 as a component such as noise, and inverting the phase thereof, for example. Accordingly, the user of the audio device 10 can listen to sound in which noise has been canceled.

In the case where the instruction signal 25 is input to the transmission/reception portion 16, the transmission/reception portion 16 outputs the instruction signal 25 to the information terminal 22. The information terminal 22 executes the instruction represented by the instruction signal 25. For example, in the case where the information terminal 22 plays music and the instruction signal 25 represents an instruction to "change the kind of music", the music played by the information terminal 22 can be changed to a specified one. The above is an example of an operation method of the audio device 10.

The processing portion 15 generates the instruction signal 25 only when the feature quantity of the sound such as a voice separated by the sound separation portion 12 is the stored feature quantity, whereby malfunction of the information terminal 22 can be inhibited more than when the instruction signal 25 is generated regardless of whether the feature quantity is stored. For example, in the case where the feature quantity of a voice of the user of the information terminal 22 is stored in the audio device 10, operation which is not intended by the user of the information terminal 22 can be inhibited from being performed in response to a voice of a person other than the user of the information terminal 22.

In the operation method shown in FIG. 3 and the like, the transmission/reception portion 16 outputs the instruction signal 25 to the information terminal 22 regardless of the content of the instruction represented by the instruction signal 25; however, one embodiment of the present invention is not limited thereto. The transmission/reception portion 16 may output the instruction signal 25 to an object other than the information terminal 22 depending on the content of the instruction.

Figure 6:
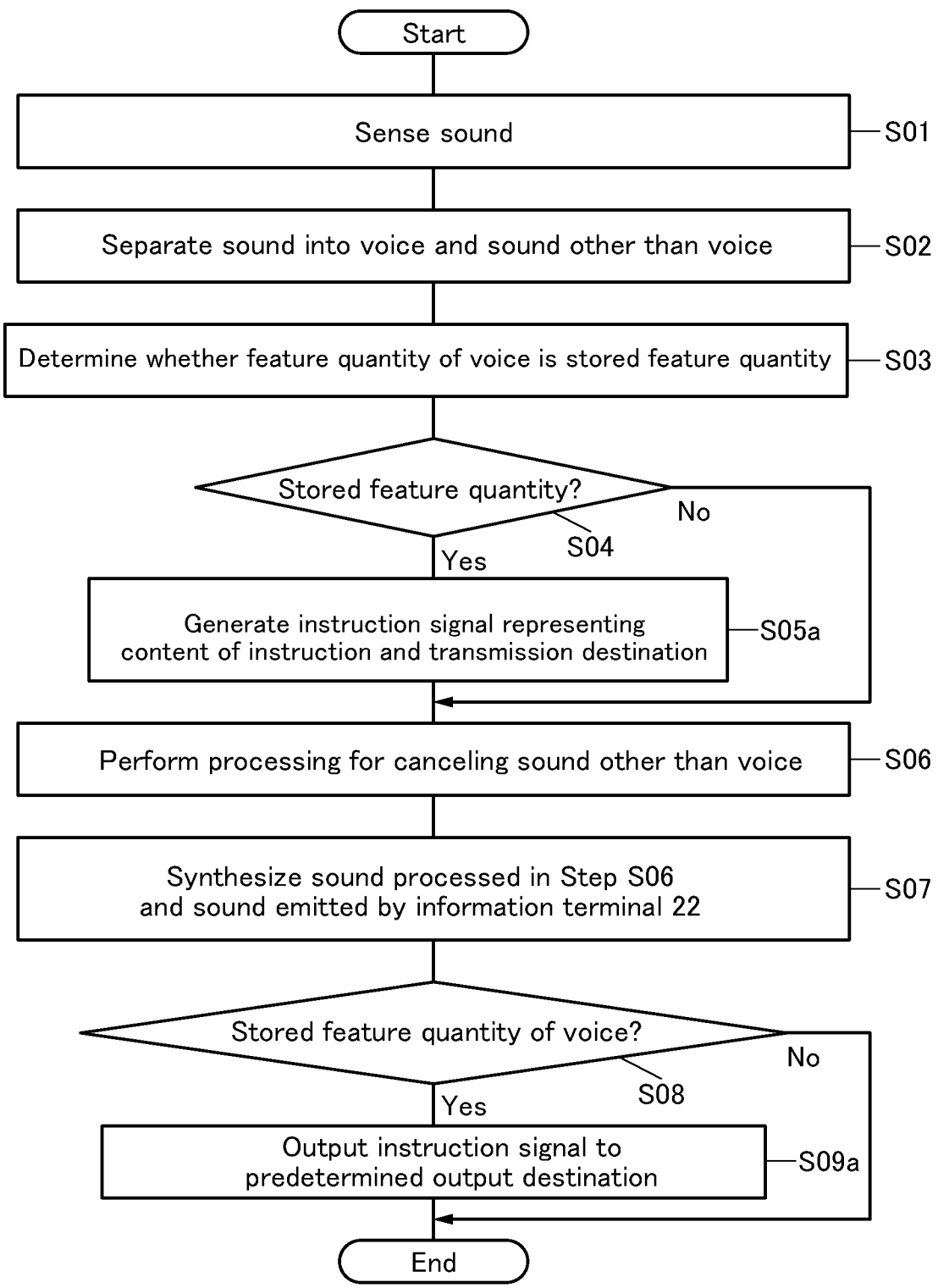
FIG. 6 is a flowchart showing an example of an operation method of an audio device.

FIG. 6 is a flowchart showing an example of the operation method of the audio device 10 that is in use, which is a variation of the operation method shown in FIG. 3. The operation method shown in FIG. 6 is different from that shown in FIG. 3 in that Step S05 is replaced with Step S05a and Step S09 is replaced with Step S09a.

In Step S05a, an instruction contained in the sound 21a that is a voice separated by the sound separation portion 12 is analyzed and the instruction signal 25 representing the content of the instruction and the output destination of the instruction is generated. The output destination can be decided in accordance with the kind of the instruction, for example. In Step S09a, the transmission/reception portion 16 outputs the instruction signal 25 to the predetermined output destination.

Figure 7A:
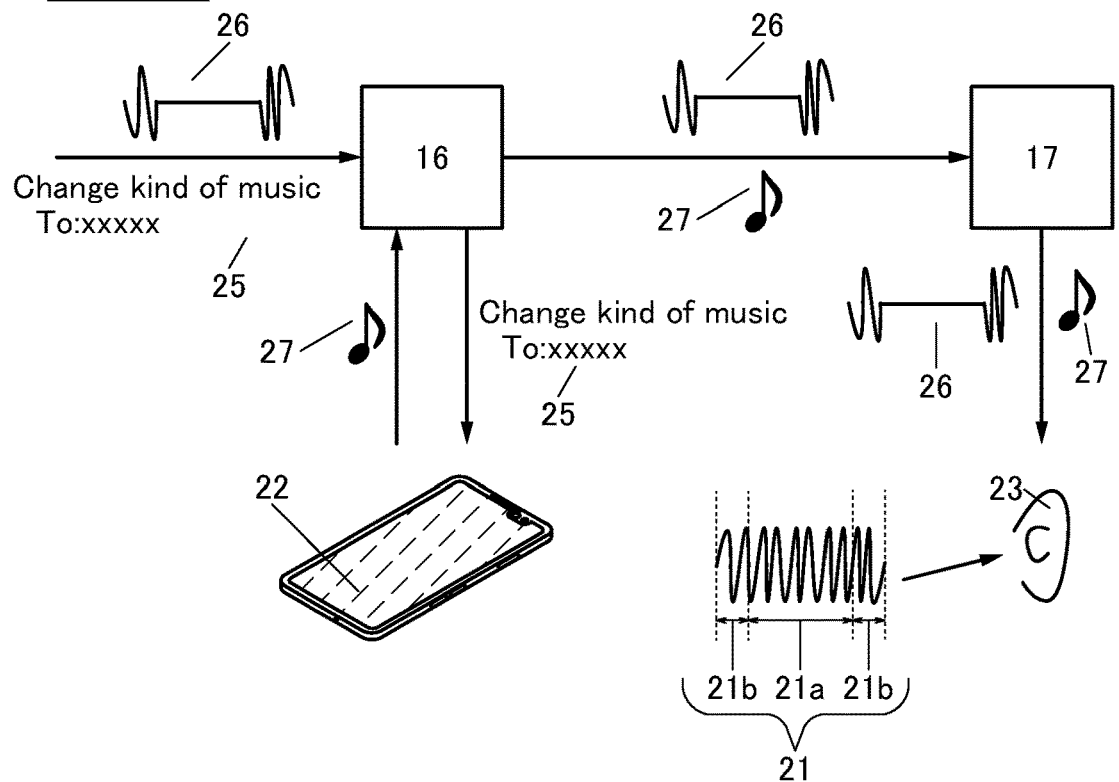
FIG. 7A and FIG. 7B are schematic views each showing an example of an operation method of an audio device.
Figure 7B:
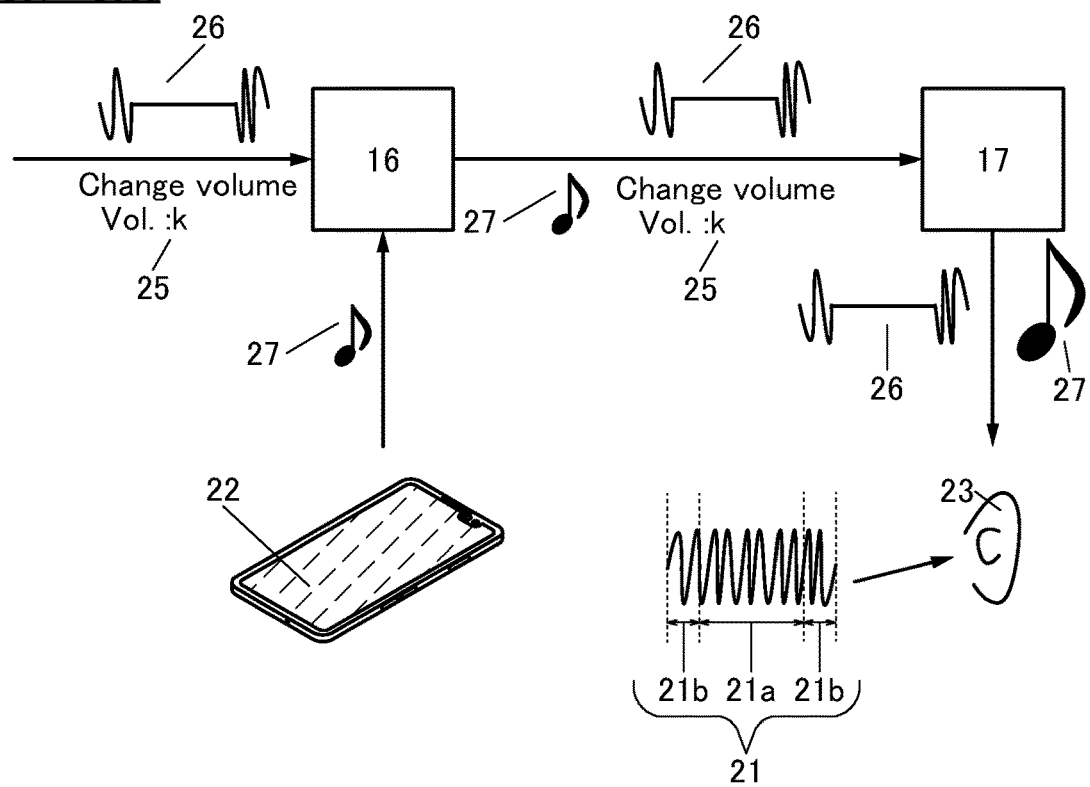

FIG. 7A and FIG. 7B show specific examples of Step S07, Step S08, and Step S09a shown in FIG. 6. FIG. 7A shows the case where the instruction signal 25 represents an instruction to "change the kind of music". In this case, the transmission/reception portion 16 outputs the instruction signal 25 to the information terminal 22 and the information terminal 22 can change the music played, to a specified one.

FIG. 7B shows an example in which the instruction signal 25 represents an instruction to "change the volume". In this case, the transmission/reception portion 16 outputs the instruction signal 25 to the sound output portion 17, and the sound output portion 17 can change the volume of the sound 27 emitted by the information terminal 22.

Note that the output destination of the instruction signal 25 may be able to be specified by the user of the audio device 10, for example. For example, the output destination of the instruction signal 25 may be able to be specified in such a manner that a person whose voiceprint is stored utters a phrase for specifying the output destination of the instruction signal 25.

In the operation method shown in FIG. 3 or the like, in the case where the sound 21*a* that is a voice is contained in the sound 21 separated by the sound separation portion 12, the processing portion 15 does not perform processing for canceling the sound 21*a* even when the feature quantity extracted from the sound 21*a* is not the stored feature quantity; however, one embodiment of the present invention is not limited thereto. In the case where the feature quantity extracted from the sound 21*a* is not the stored feature quantity, the processing portion 15 may perform processing for canceling the sound 21*a* that is a voice as well as the sound 21*b* other than a voice.

Figure 8:
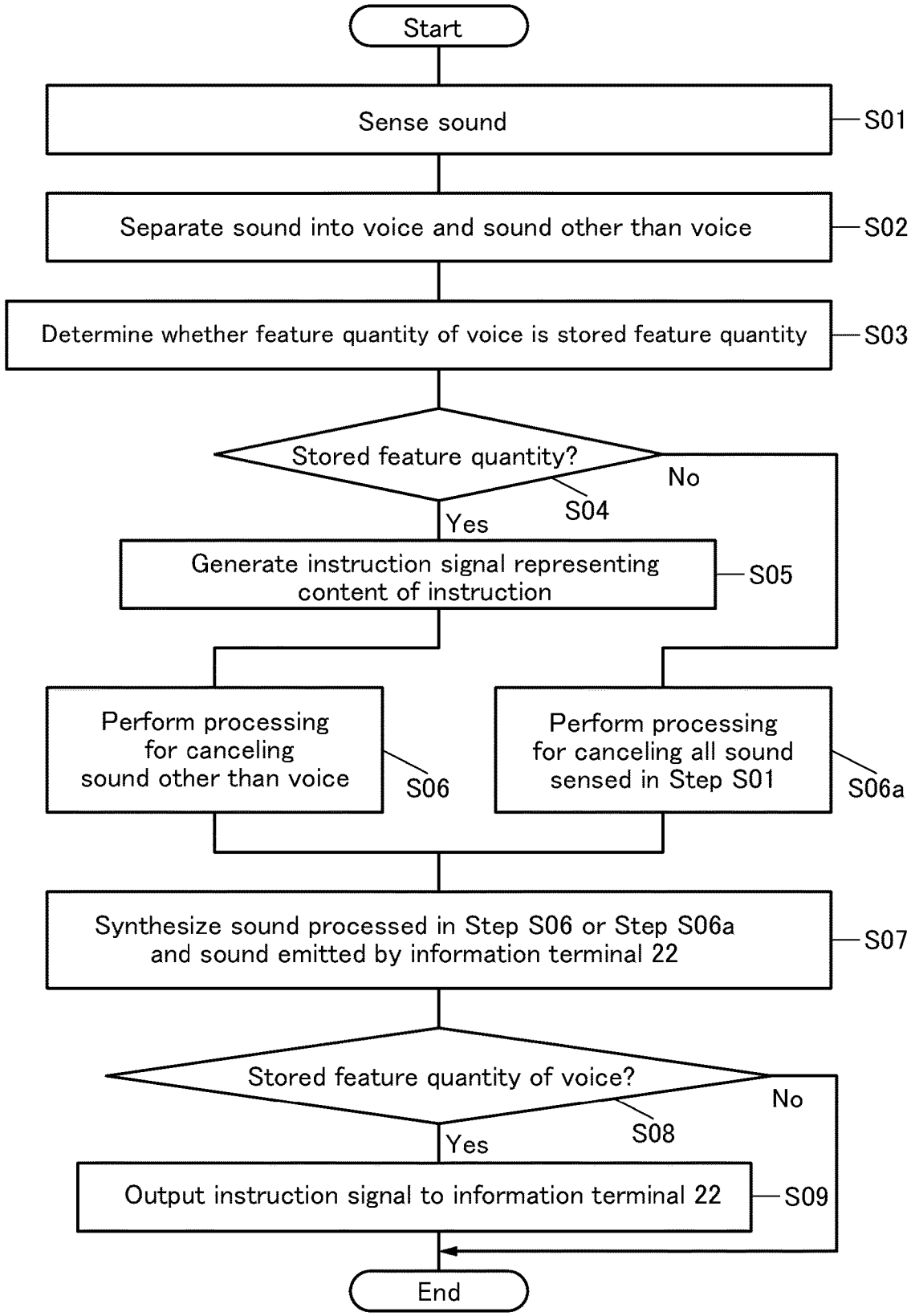
FIG. 8 is a flowchart showing an example of an operation method of an audio device.
Figure 9:
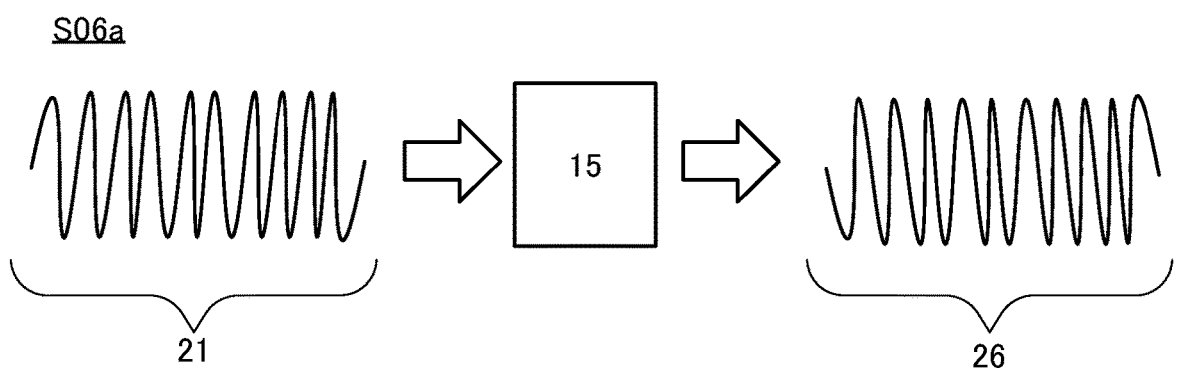
FIG. 9 is a schematic view showing an example of an operation method of an audio device.

FIG. 8 is a flowchart showing an example of the operation method of the audio device 10 that is in use, which is a variation of the operation method shown in FIG. 3. The operation method shown in FIG. 8 is different from that shown in FIG. 3 in that Step S06*a* is performed instead of Step S06 when the feature quantity extracted from the sound 21*a* is not the stored feature quantity (Step S04). FIG. 9 is a schematic view illustrating the details of Step S06*a*.

In Step S06*a*, the processing portion 15 performs processing for canceling all the sound 21 sensed by the sound sensor portion 11. For example, as shown in FIG. 9, the sound 21 is input to the processing portion 15 and sound having a phase obtained by inversion of the phase of the sound 21 is output as the sound 26.

In the case where the feature quantity extracted from the sound 21*a* is not the stored feature quantity, the processing portion 15 may perform processing for reducing the volume of the sound 21*a*.

Figure 10:
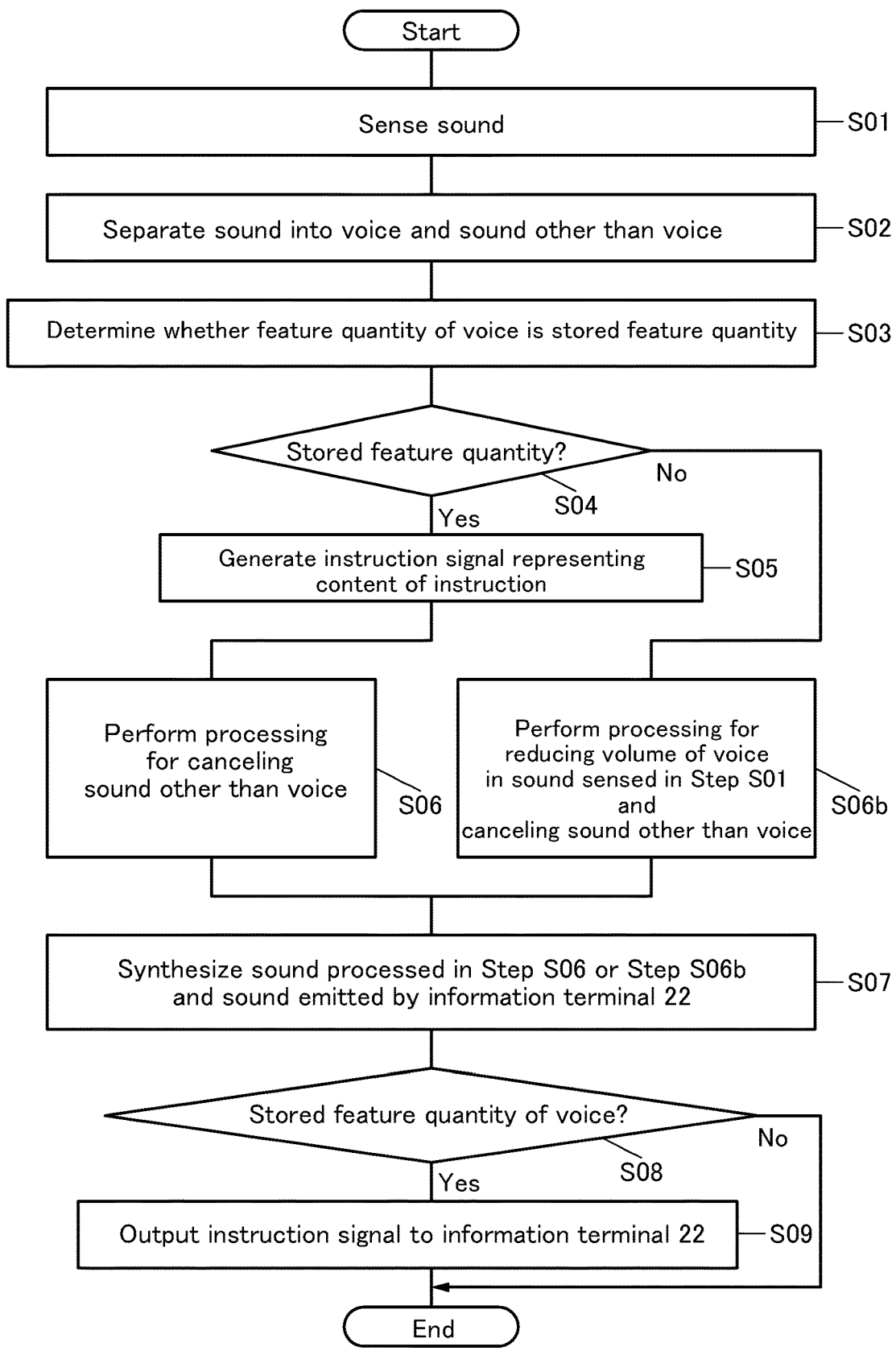
FIG. 10 is a flowchart showing an example of an operation method of an audio device.

FIG. 10 is a flowchart showing an example of the operation method of the audio device 10 that is in use, which is a variation of the operation method shown in FIG. 8. The operation method shown in FIG. 10 is different from that shown in FIG. 8 in that Step S06*a* is replaced with Step S06*b*.

Figure 11:
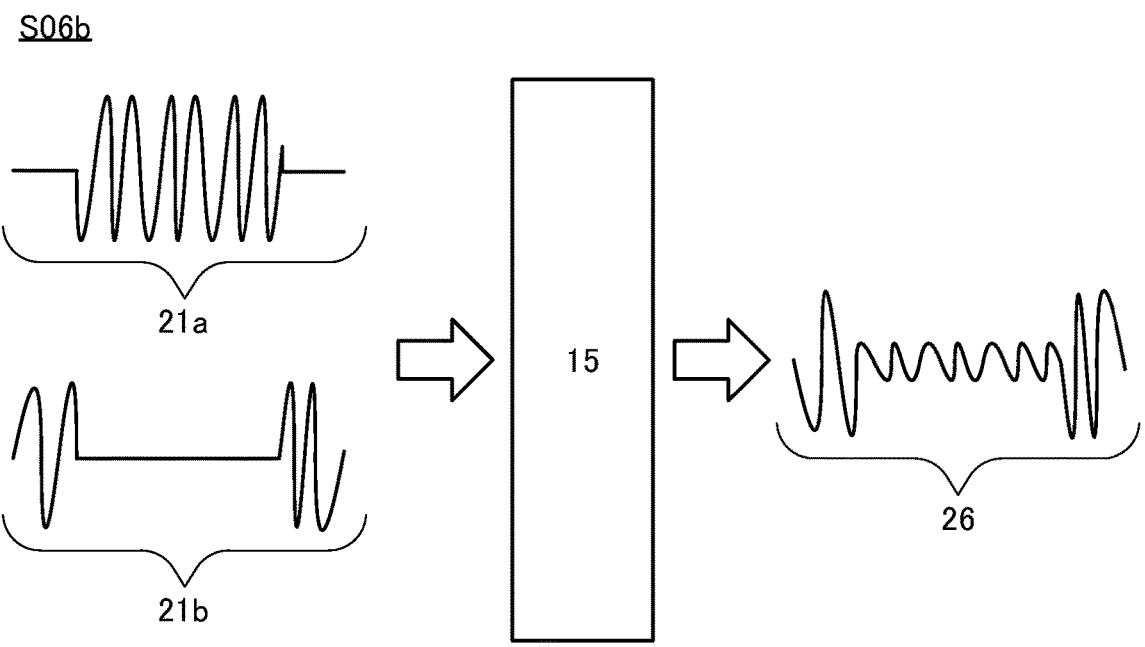
FIG. 11 is a schematic view showing an example of an operation method of an audio device.

FIG. 11 is a schematic view illustrating the details of Step S06*b*. In Step S06*b*, the processing portion 15 performs processing for reducing the volume of the sound 21*a* that is a voice in the sound 21 separated by the sound separation portion 12 and canceling the sound 21*b* that is sound other than a voice. For example, as shown in FIG. 11, the sound 21*a* and the sound 21*b* are input to the processing portion 15. Then, the processing portion 15 performs processing for inverting the phase of the sound 21*a* and reducing the amplitude thereof. Furthermore, the processing portion 15 performs processing for inverting the phase of the sound 21*b*. The sound processed by the processing portion 15 is output as the sound 26.

As described above, employing the method described in this embodiment can inhibit malfunction of the information terminal 22. In addition, noise or the like can be canceled, so that the information terminal 22 can perform highly accurate speech recognition.

REFERENCE NUMERALS

10: audio device, 11: sound sensor portion, 12: sound separation portion, 13: sound determination portion, 14: memory portion, 15: processing portion, 16: transmission/reception portion, 17: sound output portion, 21: sound, 21*a*: sound, 21*b*: sound, 22: information terminal, 23: ear, 24: data, 25: instruction signal, 26: sound, 27: sound, 30: generator, 31: sound data, 32: label, 33: learning result, 41: sound data, 42: label, 43: learning result

The invention claimed is:

1. An audio device comprising:
   a sound sensor portion;
   a sound separation portion;
   a sound determination portion;
   a processing portion; and
   an output portion,
   wherein the audio device is an earphone or a headphone,
   wherein the sound sensor portion is configured to sense first sound,
   wherein the sound determination portion is configured to store a feature quantity of a voice of a user,
   wherein the sound determination portion is configured to determine, with a machine learning model, whether the first sound has the stored feature quantity,
   wherein the processing portion is configured to analyze an instruction contained in the first sound and, when the feature quantity of the first sound is the stored feature quantity, to generate a signal representing content of the instruction, and, when the feature quantity of the first sound is not the stored feature quantity, to not generate the signal representing content of the instruction,
   wherein second sound is sound to cancel noise in the first sound,
   wherein third sound is sound electrically input to the audio device,
   wherein fourth sound is synthesized sound of the second sound and the third sound,
   wherein the processing portion is configured to generate the second sound and the third sound, and
   wherein the output portion is configured to output the fourth sound.

2. The audio device according to claim 1,
   wherein learning for the machine learning model is performed using supervised learning in which a voice is learning data and a label indicating whether the storing is to be performed is training data.

3. The audio device according to claim 1,
   wherein the machine learning model is a neural network model.

4. The audio device according to claim 1,
   wherein the second sound is sound having a phase opposite to a phase of the noise in the first sound.

5. An operation method of an audio device, comprising:
   sensing first sound;
   determining, with a machine learning model, whether a feature quantity of the first sound is a stored feature quantity of a voice of a user;
   analyzing an instruction contained in the first sound;
   generating a signal representing content of the instruction when the feature quantity of the first sound is the stored feature quantity and not generating the signal representing content of the instruction when the feature quantity of the first sound is not the stored feature quantity;
   generating second sound to cancel noise in the first sound;
   electrically inputting third sound to the audio device;
   generating fourth sound by synthesizing the second sound and the third sound; and
   outputting the fourth sound.

6. The operation method of the audio device, according to claim 5,
   wherein learning for the machine learning model is performed using supervised learning in which a voice is used as learning data and a label indicating whether storing is to be performed is used as training data.

7. The operation method of the audio device, according to claim 5,
wherein the machine learning model is a neural network model.

8. The operation method of the audio device, according to claim 5,
wherein the second sound is sound having a phase opposite to a phase of the noise in the first sound.

* * * * *